United States Patent [19]

Long et al.

[11] 4,388,134
[45] Jun. 14, 1983

[54] UNDERWATER DIVER'S DRY SUIT AND METHOD OF SEALING

[75] Inventors: Richard W. Long; Robert T. Stinton, both of San Diego, Calif.

[73] Assignee: Diving Unlimited International, Inc., San Diego, Calif.

[21] Appl. No.: 372,625

[22] Filed: Apr. 28, 1982

[51] Int. Cl.³ .............................................. B32B 31/00
[52] U.S. Cl. ................................... 156/248; 156/250; 156/252; 156/257; 156/258; 156/304.1; 156/304.3; 156/304.5; 156/304.6; 156/344; 264/319; 264/321; 428/61; 428/104
[58] Field of Search ............... 156/304.1, 304.3, 304.5, 156/304.6, 157, 159, 257, 252, 258, 93, 250, 344, 382, 247, 248; 264/321, 349, 263, DIG. 4; 428/61, 104

[56] References Cited

U.S. PATENT DOCUMENTS

| | | | |
|---|---|---|---|
| 1,899,067 | 2/1933 | Trumbell | 156/304.3 |
| 3,294,617 | 12/1966 | Way | 156/244.11 |
| 3,686,064 | 8/1972 | Bonnet et al. | 156/93 |
| 3,906,137 | 9/1975 | Bauer | 156/247 |
| 3,966,532 | 6/1976 | Harasta | 156/248 |

Primary Examiner—Edward C. Kimlin
Assistant Examiner—Timothy W. Heitbrink
Attorney, Agent, or Firm—Brown & Martin

[57] ABSTRACT

A method of sealing an underwater diving suit constructed of foam core material having a cover material on both sides, including steps of removing a portion of the cover material on the inside of the suit along the seam to expose the foam core and adhering the foam portion of a sealing strip to the foam core.

9 Claims, 5 Drawing Figures

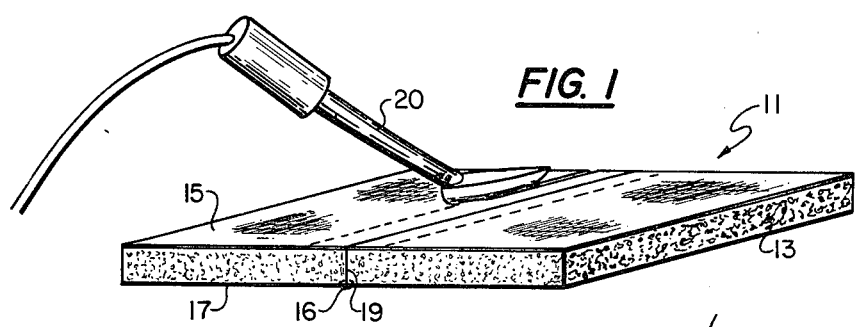
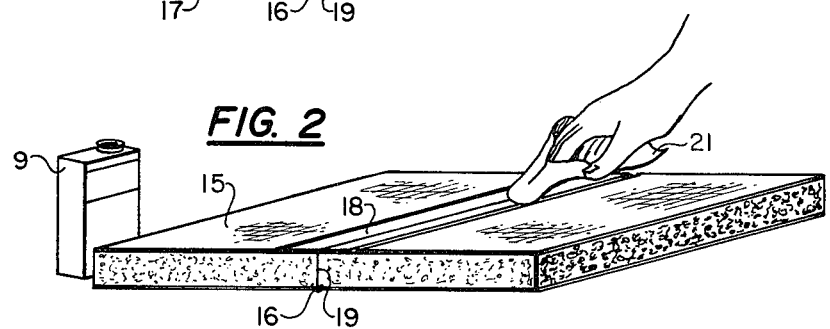
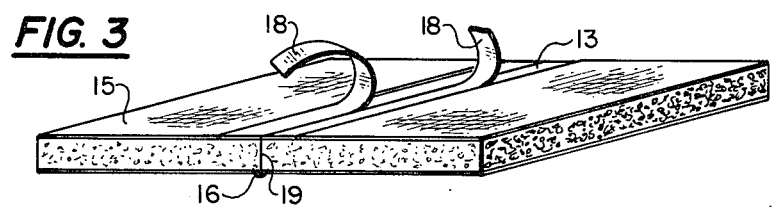
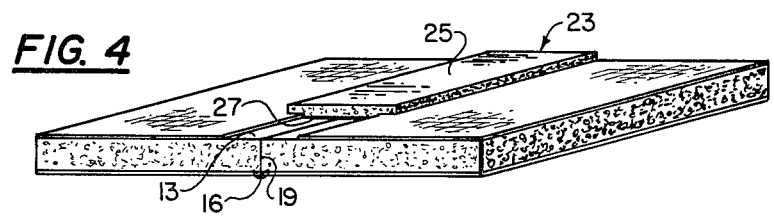
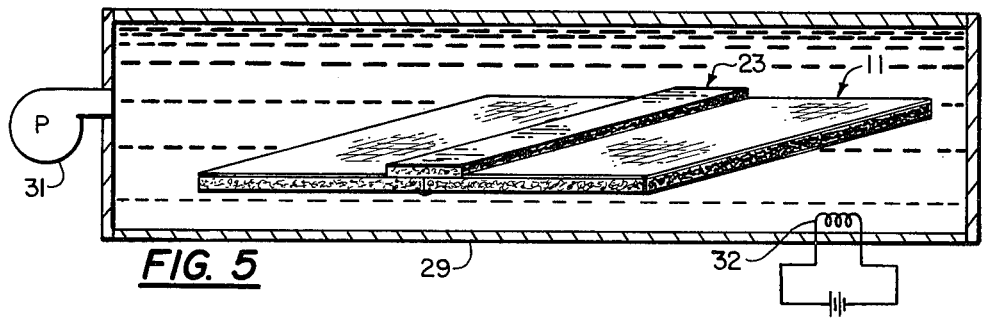

UNDERWATER DIVER'S DRY SUIT AND METHOD OF SEALING

BACKGROUND OF THE INVENTION

The invention relates to dry suits used by underwater divers and the method of sealing such suits.

Dry suits are generally made with a foam rubber core that is laminated on both faces with a nylon jersey knit glued to the core material. The sections of the suit are glued together and then sewn on the outside. In time, the adhesive becomes brittle. Stretching the suit as it is put on and taken off causes the adhesive to crack and water leaks through. This is normally referred to as "pin holing".

The normal procedure for correcting pin holing is to coat the inside of the seam with adhesive three or four times and then put a piece of nylon jersey knit rubber stripping over the seam. However, it is impossible to get complete penetration of the glue through the nylon jersey knit into the rubber foam underneath. Consequently, water migrates in between the nylon and the rubber foam to which it is affixed. The water passes the glued area and leaks into the suit.

SUMMARY

The shortcomings of the prior art procedures are overcome by an exemplary process of the present invention wherein the cover material from the inside of the diving suit is removed along the seam to expose the foam core and a foam to foam seal is created with a sealing strip.

DESCRIPTION OF THE DRAWINGS

FIG. 1 is a perspective view of a section of an underwater diver's dry suit demonstrating the step of burning along a line on each side of the seam.

FIG. 2 shows the step of impregnating the isolated strip over the seam with a solvent such as toluene.

FIG. 3 demonstrated the step of removing the isolated strip from over the seam.

FIG. 4 shows the positioning of a sealing strip over the exposed core along the seam of the dry suit.

FIG. 5 demonstrates the step of compressing the dry suit and seal in heated water under pressure.

DETAILED DESCRIPTION OF THE DRAWINGS

Referring to the drawings, a portion of dry suit for underwater divers is shown at 11. The suit includes a foam core 13 of material such as foam rubber. The faces of the core 13 are covered with layers 15 and 17 of material such as nylon jersey. The layers of nylon jersey are affixed to the core 13 with a suitable adhesive. The nylon layers are sewn to the core and to each other with blind stitches 16. This provides a generally satisfactory construction. However, after a certain amount of time, the adhesive dries and cracks and the continual putting on and taking off of the suit causes the adhesive to deteriorate in the seams and cause small pin hole leaks. Water leaks into the inside of the suit and causes the diver to become wet, cold and uncomfortable.

The process of the present invention eliminates this problem and provides a watertight seal along the seams of the suit. Strips 18 of the nylon layer 15 are removed from along the seam 19 on the inside of the suit. One way of doing this is shown in FIG. 1 of the drawings. A heated iron 20 is run along the layer of nylon 15 on the inside of the suit on a line approximately one-quarter inch to three-eighths inch from the seam 19 of the suit sections on each side of the seam. Thus, the strips 18 of nylon are detached or isolated from the rest of the layer 15 because the nylon along the path of the iron is incinerated and destroyed. These isolated strips are still affixed to the foam core 13 by the adhesive and the next step is to release the strips 18 from the foam core 13 so that the foam core is exposed without destroying the foam core. One method of doing this is to pass a cloth 21 containing toluene from source 9 over the strips 18 as shown in FIG. 2. The fumes from the cloth 21 dissolve or weaken the adhesive. The strips 18 can now be removed as shown in FIG. 3, leaving the surface of the core 13 of foam material exposed. The nylon strips 18 are approximately three-eighths inch wide.

Next, a strip 23 composed of an outer layer 25 of material such as nylon jersey and an inner layer 27 of foam material such as closed cell foam rubber is positioned over the core surface 13 with the foam of the core surface 13 facing the foam 27 on the strip 23, and with an adhesive between the foam sections to bond them together in a foam to foam connection. The result is a strip 23 approximately three-quarters inch wide on the interior of the suit with the foam 27 of the strip 25 adhering to the foam 13 of the suit. This foam to foam contact along the seam gives a complete watertight seal.

The result is a complete seal on the inside of the suit and water cannot leak through the seam. Even if water leaks through the seam itself, the water cannot migrate between the nylon and the rubber foam because the nylon has been removed over the seam and the foam to foam contact provides a one-hundred percent seal.

This seal may be further guaranteed by a procedure which reduces the size of the bubbles in the foam. The above sealing procedure is accomplished after the sections of the suit are cut and sewn together. There are many pressure/temperature/time profiles to compress the foam. The one hereinafter discussed is the most efficient we have found to date. Within a week after the construction of the suit, the suit is placed inside a pressure chamber 29 that is filled with water. At a controlled temperature such as about 60 degrees F. to 75 degrees F. provided by heater 32, the chamber is pressurized by means such as a hydrostatic pump 31 to approximately 500 pounds per square inch pressure. The suit is left at this temperature and pressure for approximately twenty-four to forty-eight hours. As a result, the cellular material in the core of the suit collapses, reducing the size of the cellular bubbles and rendering the suit and seals much stronger. This procedure removes some of the stretch in the material and the material will not return to its original condition.

A diving suit using this technique may utilize a thin foam material about three thirty seconds inch thick. As discussed above, this foam material has a layer of nylon type material on each face. A durable nylon layer is provided on the outside of the suit. This is preferably, a canvas type material. The ability to withstand wear is increased considerably. When the suit is processed through the compression procedure, it is permanently collapsed. The material has very little compression left and it changes little in thermal conductivity or buoyancy.

Since the buoyancy of the compressed suit does not change with depth, the thermal protection and buoyancy of the garment are constant and independent of depth. The surface buoyancy and "at depth" buoyancy are virtually the same, and the diver is not required to make buoyancy adjustments. Stretch of the diving suit material is reduced and the material is stronger.

Having thus described our invention, we claim:

1. The method of forming a watertight dry suit for underwater divers, said suit consisting of sections of foam core material laminated on both sides with a cover material, said sections being stitched together, including the steps of:
   (1) removing a portion of the cover material on the inside of the suit along a seam to expose the foam core without destroying it;
   (2) coating the exposed foam material with an adhesive;
   (3) placing a sealing strip of said cover material with foam on one side over the adhesive, with the foam side of the sealing strip in contact with the adhesive to foam a secure foam to foam seal at the seam.

2. A method of forming a dry suit for underwater divers according to claim 1 wherein the core material is foam rubber and the cover material is a nylon type material.

3. A method of forming a dry suit for underwater divers according to claim 1 wherein the material is removed to expose the foam core of the suit material along a strip about one-half to three-quarters inch wide.

4. A method of forming a suit for underwater divers according to claim 3 including the step of passing a hot iron along a line on each side of the seam to provide a disengaged strip of cover material; and removing the disengaged strip.

5. A method of forming a dry suit for underwater divers according to claim 4 wherein a solvent is applied on the cover material of the suit for weakening the separated cover strip from the suit; and removing the separated strip.

6. The method of forming a dry suit for underwate divers according to claim 5 wherein the cover material is nylon.

7. A method of forming a dry suit for underwater divers according to claim 6 wherein the sealing strip is approximately three-quarters inch wide.

8. A method of forming a dry suit for underwater divers according to claim 1 wherein the foam in the suit is thereafter compressed to further improve the seal.

9. A method of forming a dry suit for underwater divers according to claim 8 wherein the suit is compressed at a pressure or about 500 pounds per square inch and at a temperature of about sixty to seventy-five degrees Farenheit for a period of about twenty-four to forty-eight hours.

* * * * *

UNITED STATES PATENT AND TRADEMARK OFFICE
CERTIFICATE OF CORRECTION

PATENT NO. : 4,388,134
DATED : June 14, 1983
INVENTOR(S) : Richard W. Long and Robert T. Stinton It is certified that error appears in the above-identified patent and that said Letters Patent are hereby corrected as shown below:

Claim 1, Line 21, delete first occurrence of "foam"

and insert --form--.

Signed and Sealed this

Thirtieth Day of August 1983

[SEAL]

Attest:

GERALD J. MOSSINGHOFF

Attesting Officer

Commissioner of Patents and Trademarks